Patented Mar. 21, 1944

2,344,784

UNITED STATES PATENT OFFICE 2,344,784

METHOD OF PREPARING GUANAMINES

Wilbur Null Oldham, Old Greenwich, Conn., assignor to American Cyanamid Company, New York, N. Y., a corporation of Maine No Drawing. Application August 30, 1941, Serial No. 409,144

9 Claims. (Cl. 260—249.5)

This invention relates to an improved process of preparing guanamines.

Guanamines have been prepared by the reaction of biguanide with certain esters but in the case of many esters the reaction is slow or incomplete and this is particularly true when the reaction takes place with substituted biguanides such as N-phenyl biguanide.

According to the present invention I have found that the reaction between esters and biguanides can be greatly accelerated and yields improved by using caustic alkalies as condensing agents. The action does not appear to be catalytic as improved results are obtained by increasing the amount of condensing agent up to the point where approximately stoichiometrical equivalents are present.

The use of caustic alkalies as condensing agents do not alter the other factors in the reaction of esters with biguanides and it is an advantage of the present invention that no new technique in the production of guanamines needs to be acquired.

As with other processes of reacting esters with biguanides to form guanamines, it is advantageous to operate in a suitable solvent for which the lower molecular alcohols are particularly suitable such as methanol, ethanol, ethyl ether of ethylene glycol, and the like. These alcohols are excellent solvents for biguanide and/or the ester but do not have great solubility for the guanamines produced. They therefore constitute the preferred solvents to be used in the process of the present invention.

The invention will be described in greater detail in conjunction with the following specific examples. The parts are by weight.

EXAMPLE 1

*Lauroguanamine*

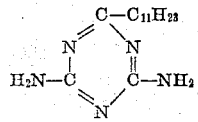

Ten parts of biguanide are dissolved in 200 parts of ethanol and reacted with 32 parts of methyl laurate and 4 parts of sodium hydroxide. After standing, the guanamine was precipitated in the form of its sulfuric acid salt and after purification gave a yield of 66% of lauroguanamine.

EXAMPLE 2

*4-N-phenylacetoguanamine*

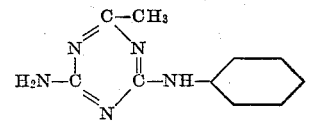

35.54 parts of phenyl biguanide were dissolved in 20 parts of methanol and were reacted with 44 parts of ethyl acetate and 11.2 parts of potassium hydroxide in the form of a 25% solution of alcoholic caustic potash. After standing, a precipitate was obtained which after purification gave a yield of 45% of 4-N-phenylacetoguanamine melting at 179° C.

EXAMPLE 3

*4-N-phenylbenzoguanamine*

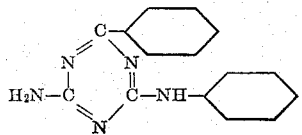

Ten parts of sodium hydroxide were dissolved in 80 parts of methanol. 44.2 parts of phenylbiguanide and 55 parts of methyl benzoate in 80 parts of methanol were then added. The mixture set into a solid mass; more methanol is then added until about 320 parts of methanol are present. This solution is then filtered and 4-N-phenylbenzoguanamine is obtained melting at 199–201° C., the yield being about 20%.

What I claim is:

1. A process of preparing guanamines which comprises reacting an ester of an organic carboxylic acid with a biguanide in the presence of a caustic alkali in amounts sufficient to act as an effective condensing agent.

2. A process of preparing guanamines which comprises reacting an ester of an organic carboxylic acid with biguanide in the presence of a caustic alkali in amounts sufficient to act as an effective condensing agent.

3. A process of preparing guanamines which comprises reacting an ester of an organic carboxylic acid with a biguanide in the presence of substantially stoichiometrical amounts of a caustic alkali.

4. A process of preparing guanamines which comprises reacting an ester of an organic carboxylic acid with biguanide in the presence of substantially stoichiometrical amounts of a caustic alkali.

5. A method of producing lauroguanamine which comprises reacting an ester of lauric acid with biguanide in the presence of substantially stoichiometrical equivalents of a caustic alkali.

6. A method of producing 4-N-phenylacetoguanamine which comprises reacting an ester of acetic acid with phenylbiguanide in the presence of substantially stoichiometrical equivalents of caustic alkali.

7. A method of preparing 4-N-phenylbenzoguanamine which comprises reacting an ester of benzoic acid with phenyl biguanide in the presence of substantially stoichiometrical equivalents of a caustic alkali.

8. A method according to claim 3 in which the reaction is carried out in solution of a lower monohydric alcohol.

9. A method according to claim 4 in which the reaction is carried out in solution of a lower monohydric alcohol.

WILBUR NULL OLDHAM.